US011757879B2

(12) United States Patent
Mandalia et al.

(10) Patent No.: US 11,757,879 B2
(45) Date of Patent: *Sep. 12, 2023

(54) SECURITY CONTROL FOR AN ENTERPRISE NETWORK

(71) Applicant: Kyndryl, Inc., New York, NY (US)

(72) Inventors: Baiju D. Mandalia, Boca Raton, FL (US); Tung OuYang, Apex, NC (US)

(73) Assignee: Kyndryl, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/582,103

(22) Filed: Jan. 24, 2022

(65) Prior Publication Data
US 2022/0150247 A1 May 12, 2022

Related U.S. Application Data

(63) Continuation of application No. 14/818,495, filed on Aug. 5, 2015, now Pat. No. 11,265,317.

(51) Int. Cl.
*H04L 9/40* (2022.01)
*H04W 12/12* (2021.01)
(Continued)

(52) U.S. Cl.
CPC ........ *H04L 63/0876* (2013.01); *H04L 63/107* (2013.01); *H04L 63/1408* (2013.01);
(Continued)

(58) Field of Classification Search
None
See application file for complete search history.

(56) References Cited

U.S. PATENT DOCUMENTS 6,791,603 B2    9/2004   Lazo et al.
7,221,775 B2    5/2007   Buehler
(Continued)

FOREIGN PATENT DOCUMENTS

| CN | 1477566 | 2/2004 |
|----|---------|--------|
| JP | 2006304323 | 11/2006 |
| WO | 2004/045215 | 5/2004 |

OTHER PUBLICATIONS

Disclosed Anonymously, "Advanced Video Management Systems," ip.com, IP.com No. IPCOM000191225D, IP.com Electronic Publication: Dec. 22, 2009, 21 pages.

(Continued)

*Primary Examiner* — Joseph P Hirl
*Assistant Examiner* — Hassan Saadoun
(74) *Attorney, Agent, or Firm* — Dan Housley; Andrew M. Calderon; Calderon Safran & Cole, P.C.

(57) ABSTRACT

A computing device detects that another computing device has connected to a network. The computing device determines whether the other computing device is valid and whether the computing device is being utilized for one or more suspicious activities. Based on determining that the other computing device is being utilized for one or more suspicious activities, the computing device determines a location of the other computing device, determines whether a user associated with the other computing device can be identified, and based on determining that the user associated with the other computing device cannot be identified, disables the other computing device, and transmits an alert to security personnel.

18 Claims, 3 Drawing Sheets

(51) Int. Cl.
*H04W 12/06* (2021.01)
*H04W 12/63* (2021.01)
*H04W 12/71* (2021.01)
*H04W 12/64* (2021.01)

(52) U.S. Cl.
CPC ........... *H04W 12/06* (2013.01); *H04W 12/12* (2013.01); *H04W 12/63* (2021.01); *H04W 12/64* (2021.01); *H04W 12/71* (2021.01)

(56) References Cited

U.S. PATENT DOCUMENTS

| | | | |
|---|---|---|---|
| 7,280,673 | B2 | 10/2007 | Buehler et al. |
| 7,286,157 | B2 | 10/2007 | Buehler |
| 7,346,187 | B2 | 3/2008 | Buehler |
| 7,460,685 | B2 | 12/2008 | Buehler |
| 7,477,285 | B1 | 1/2009 | Johnson |
| 7,500,266 | B1 * | 3/2009 | Vukelich ............ H04L 63/1416 726/23 |
| 8,146,146 | B1 | 3/2012 | Coviello et al. |
| 8,438,241 | B2 | 5/2013 | Bar et al. |
| 8,613,049 | B2 | 12/2013 | Yasuda |
| 8,769,688 | B2 | 7/2014 | Geigel |
| 9,497,688 | B2 * | 11/2016 | Pecen .................. H04W 12/08 |
| 2003/0137968 | A1 | 7/2003 | Lareau et al. |
| 2003/0226023 | A1 | 12/2003 | Peters |
| 2004/0119848 | A1 | 6/2004 | Buehler |
| 2004/0164863 | A1 | 8/2004 | Fallin et al. |
| 2006/0036838 | A1 | 2/2006 | Salcedo et al. |
| 2006/0243797 | A1 | 11/2006 | Apte et al. |
| 2007/0011196 | A1 | 1/2007 | Ball et al. |
| 2007/0182818 | A1 | 8/2007 | Buehler |
| 2007/0248244 | A1 | 10/2007 | Sato et al. |
| 2008/0005088 | A1 | 1/2008 | Yanai |
| 2008/0143481 | A1 | 6/2008 | Abraham et al. |
| 2010/0205667 | A1 * | 8/2010 | Anderson ............... G06F 3/017 726/19 |
| 2011/0143768 | A1 | 6/2011 | Lane et al. |
| 2011/0282662 | A1 * | 11/2011 | Aonuma ................. G10L 17/26 704/E15.001 |
| 2013/0231130 | A1 * | 9/2013 | Cherian ................ H04W 4/025 455/456.1 |
| 2014/0161027 | A1 * | 6/2014 | Larue .................. H04W 12/122 370/328 |
| 2014/0208427 | A1 * | 7/2014 | Grier .................... H04L 63/1416 726/23 |
| 2014/0283073 | A1 * | 9/2014 | Zeng .................... H04L 63/1408 726/23 |
| 2015/0186711 | A1 | 7/2015 | Baldwin et al. |
| 2015/0295940 | A1 * | 10/2015 | Patel ...................... H04L 67/52 726/29 |

OTHER PUBLICATIONS

IBM Software: Industry Solutions, "IBM Presence Zones: Gain insight to in-store customer behavior and engage shoppers in real-time," IBM Corporation, Somers, NY, Oct. 2013, 4 pages.

Prlog, "Sony Showcases First Intelligent Video Security Camera in Dubai", Mar. 29, 2007, 3 Pages.

Wikipedia, "Video search engine", Printed on May 10, 2018, 5 Pages.

Tong-Hyung, "Google or Video Search?: Answers Hopes to Find Business Model for Innovative Search Engine", The Korea Times, 5 Pages, printed on May 10, 2018.

Zhu et al., "Video Data Mining: Semantic Indexing and Event Detection from the Association Perspective", IEEE Transactions on Knowledge and Data Engineering, vol. 17, Issue 5 (May 2005), pp. 665-677, Abstract, 1 page.

* cited by examiner

SECURITY CONTROL FOR AN ENTERPRISE NETWORK

TECHNICAL FIELD

The present invention relates generally to network security, and more particularly to security control for an enterprise network.

BACKGROUND

Computers have transformed the manner in which we retrieve information and communicate with one another. As time has passed, computers have quickly transformed from stationery devices, such as CPUs, to laptops and mobile devices. Laptops and mobile devices give people the freedom to retrieve information and communicate with one another while on the go. However, computing devices also may allow people to access classified or confidential information by way of a network. With the sheer amount of valuable information being maintained digitally, being able to keep digital information secure has never been more important.

SUMMARY

The present invention provides a method, system, and computer program product for determining information to display to a user of a wearable computing device. A computing device detects that another computing device has connected to a network. The computing device determines whether the other computing device is valid, wherein determining whether the other computing device is valid further comprises comparing a MAC address associated with the other computing device with a database containing one or more MAC addresses associated with one or more valid devices. Based on determining that the other computing device is valid, the computing device determines whether the other computing device is being utilized for one or more suspicious activities. Based on determining that the other computing device is being utilized for one or more suspicious activities, the computing device: determines a location of the other computing device, determines whether a user associated with the other computing device can be identified, and based on determining that the user associated with the other computing device cannot be identified, disables the other computing device and transmits an alert to security personnel.

DETAILED DESCRIPTION

Embodiments of the present invention will now be described in detail with reference to the accompanying Figures.

Figure 1:
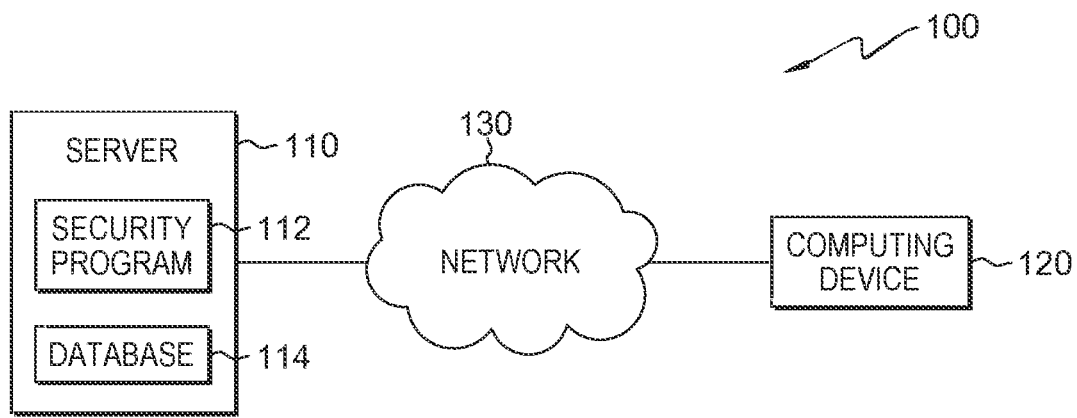
FIG. 1 illustrates a network security system, in accordance with an embodiment of the invention.

FIG. 1 illustrates network security system 100, in accordance with an embodiment of the invention. In an exemplary embodiment, network security system 100 includes server 110 and computing device 120 all interconnected via network 130.

In the example embodiment, network 130 is the Internet, representing a worldwide collection of networks and gateways to support communications between devices connected to the Internet. Network 130 may include, for example, wired, wireless, or fiber optic connections. In other embodiments, network 130 may be implemented as an intranet, a local area network (LAN), or a wide area network (WAN). In general, network 130 can be any combination of connections and protocols that will support communications between server 110 and computing device 120.

Computing device 120 may be a desktop computer, a notebook, a laptop computer, a tablet computer, a handheld device, a smart-phone, a thin client, or any other electronic device or computing system capable of receiving and sending data to and from other computing devices, such as server 110, via network 130. Although not shown, optionally, computing device 120 can comprise a cluster of web servers executing the same software to collectively process the requests for the web pages as distributed by a front end server and a load balancer. Computing device 120 is described in more detail with reference to FIG. 3.

Server 110 includes security program 112 and database 114. Server 110 may be a desktop computer, a notebook, a laptop computer, a tablet computer, a handheld device, a smart-phone, a thin client, or any other electronic device or computing system capable of receiving and sending data to and from other computing devices such as computing device 120 via network 130. Although not shown, optionally, server 110 can comprise a cluster of web servers executing the same software to collectively process the requests for the web pages as distributed by a front end server and a load balancer. Server 110 is described in more detail with reference to FIG. 3.

Database 114 includes employee information such as employee personal information, employee login credentials, devices registered to employees, access privilege information for all employees, MAC addresses for all registered devices, and other types of information regarding employees of a certain organization. Database 114 is described in more detail with reference to FIG. 3.

Security program 112 is a software application capable of detecting a computing device, such as computing device 120, attempting to access a network, such as network 130. In the example embodiment, security program 112 is also capable of determining whether a computing device is a valid device (allowed to access network 130). Furthermore, security program 112 is capable of monitoring one or more servers connected to network 130 and determining whether a computing device is utilizing network 130 to perform suspicious activity (such as retrieve or access confidential documents located on the one or more servers) and if so, is further capable of disabling the device and/or identifying a location of the computing device and notifying security. The operations and functions of security program 112 are described in more detail with reference to FIG. 2.

Figure 2:
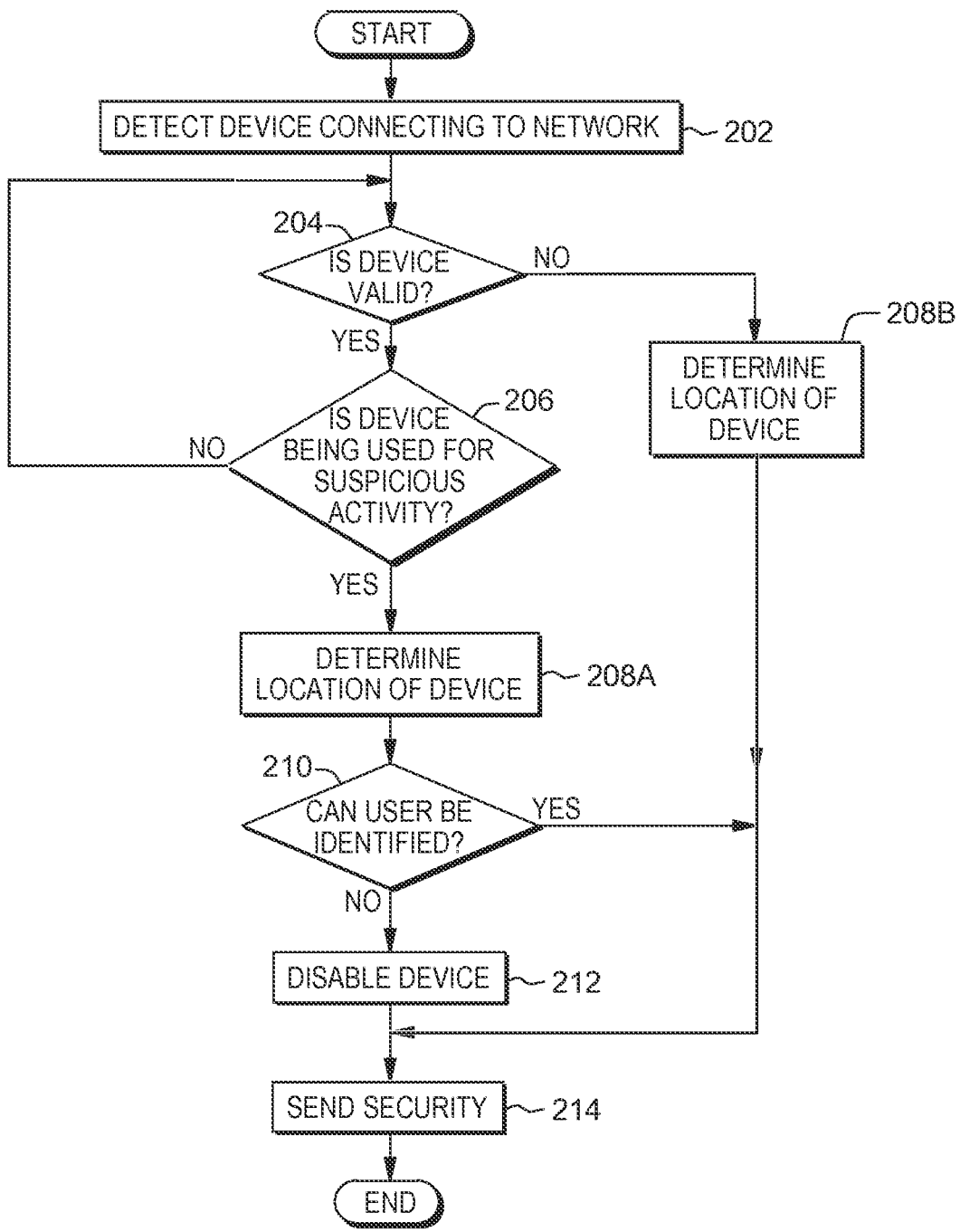
FIG. 2 is a flowchart illustrating the operations of the security program of FIG. 1 in determining whether a computing device has permission to access a network and whether the computing device is utilizing the network for any suspicious activity, in accordance with an embodiment of the invention.

FIG. 2 is a flowchart illustrating the operation of security program 112 in determining whether a computing device has permission to access a network and whether the computing device is utilizing the network for any suspicious activity. In the example embodiment, security program 112 detects that computing device 120 has connected to/accessed network 130 (step 202). In the example embodiment, security program 112 communicates with network servers in order to receive network access information with regard to network 130. In other embodiments, server 110 functions as the network server(s) for network 130 and directly communicates with devices attempting to access network 130.

Security program 112 determines whether computing device 120 is a valid device (decision 204). In the example embodiment, security program 112 determines whether computing device 120 is a valid device by comparing the MAC address of computing device 120 to database 114 in order to determine whether there is a matching MAC address contained in database 114. If security program 112 determines that computing device 120 is not a valid device (decision 204, "NO" branch), security program 112 determines the location of computing device 120 (step 208B). This step will be explained in further detail below.

If security program 112 determines that computing device 120 is a valid device (decision 204, "YES" branch), security program 112 determines whether computing device 120 is utilizing network 130 to perform suspicious activity (decision 206). In the example embodiment, security program 112 determines whether computing device 120 is involved in suspicious activity by determining whether the device is attempting to download confidential information (or highly confidential information—information marked with a high or highest confidentiality level designation), or determining whether computing device 120 is accessing (attempting to access via network 130) an amount of confidential or classified documents within a certain period of time that exceeds a threshold value. For example, the threshold value may be 5 attempts/accesses within a 5 minute period. In other embodiments, the threshold value may be another value. If security program 112 determines that computing device 120 is attempting to download confidential information or accessing (attempting to access) an amount of confidential or classified documents with a certain period of time that exceeds a threshold value, security program 112 determines (or flags) computing device 120 as being involved in suspicious activity. If security program 112 determines that computing device 120 is not attempting to download confidential information or is not accessing (attempting to access) an amount of confidential or classified documents with a certain period of time that exceeds a threshold value, security program 112 may not determine (flag) computing device 120 as being involved in suspicious activity.

In other embodiments, security program 112 may also determine whether computing device 120 is utilizing network 130 to perform suspicious activity by identifying the resources that are being accessed by computing device 120 and comparing the accessed resources to a past history of utilization (stored in database 114) in order to determine whether the usage of resources aligns with past usage of resources by computing device 120. In this other embodiment, a similarity factor may be determined based on the comparison between the present usage of resources by computing device 120 and past usage of resources by computing device 120. Security program 112 may compare the similarity factor to a threshold value in order to determine whether computing device 120 is utilizing network 130 to perform suspicious activity. For example, if security program 112 determines that the similarity factor is below a threshold value, security program 112 determines that computing device 120 is utilizing network 130 to perform suspicious activity. If the usage of resources by computing device 120 does align with past usage by computing device 120, security program 112 may not flag computing device 120 as being involved in suspicious activity. If the usage of resources does not align with past usage, security program 112 may flag computing device 120 as being involved in suspicious activity.

If security program 112 determines that computing device 120 is not utilizing network 130 to perform suspicious activity (decision 206, "NO" branch), security program 112 moves back to decision 204 and determines whether another device attempting to access network 130 is a valid device. In the example embodiment, security program 112 continuously monitors to determine whether computing device 120 is involved in suspicious activity for the entirety that computing device 120 is connected to network 130.

If security program 112 determines that computing device 120 is utilizing network 130 to perform suspicious activity (decision 206, "YES" branch), security program 112 determines the location of computing device 120 (step 208A). In the example embodiment, security program 112 utilizes indoor location technology, such as utilized in IBM® Presence Zones (IBM is a registered trademark of International Business Machines Corp.). IBM Presence Zones is an intelligent location-based technology that detects and analyzes the presence of users in a certain location (such as shoppers in a store) by utilizing Wi-Fi signals from computing devices, such as smartphones and tablets. In the example embodiment, security program 112 determines the location of computing device 120 by way of triangulation of the Wi-Fi signal transmitted by the device. Triangulation may be accomplished by security program 112 communicating, via network 130, with Wi-Fi access points in order to determine the closest access points to computing device 120 (i.e., the access points that computing device 120 is using to access network 130).

Security program 112 then determines whether the user of computing device 120 can be identified (decision 210). In the example embodiment, security program 112 communicates via network 130 and utilizes security cameras (connected to network 130) to attempt to visually identify the user of computing device 120. In the example embodiment, security program 112 utilizes facial recognition technology in order to compare the images captured of the user of computing device 120 to images in database 114 and, if necessary, images in additional public databases and/or social media resources. In addition, security program 112 may utilize security cameras to identify the user of computing device 120 by zooming on an employee badge, name tag or other identification information visually present on the user. In other embodiments, security program 112 may determine whether the user of computing device 120 can be identified by further referencing employee information (such as biographical/personal information, pictures, etc.) contained in database 114 in association with the MAC address of computing device 120. In even further embodiments, security program 112 may utilize and retrieve information from badge entry devices that may be utilized by the user of computing device 120 to access a particular area of a site. Furthermore, once the user of computing device 120 is identified, security program 112 may reference database 114 in order to determine whether the user of computing device 120 is authorized to be present in the area he/she is present in. This may include referencing security clearance information contained in employee files in database 114. If security program 112 determines that the user of computing device 120 is present in an area that is not authorized, security program 112 may disable computing device 120.

If security program 112 determines that the user of computing device 120 cannot be identified (decision 210, "NO" branch) and is a valid device (decision 204, "YES" branch), security program 112 disables computing device 120 via network 130 (step 212) and transmits an alert to security personnel (to devices held by security personnel) detailing the location of computing device 120 (step 214). In other embodiments, security program 112 may only disable computing device 120 via network 130. In the example embodiment, each valid device may contain a Bluetooth® (Bluetooth is a registered trademark of Bluetooth SIG, Inc) or BLE (low energy Bluetooth) with a network protocol enabled that allows for the device to be disabled via a network, such as network 130. In the example embodiment, the protocol may not be disabled without permission from an administrator, or in the case of a company network, without permission from relevant company personnel.

If security program 112 determines that the user of computing device 120 can be identified (decision 210, "YES" branch) and is a valid device (decision 204, "YES" branch), security program 112 transmits an alert to security personnel (to devices held by security personnel) detailing the location of computing device 120 (step 214). In other embodiments, security program 112 may additionally disable computing device 120 via network 130.

As stated above, if security program 112 determines that computing device 120 is not a valid device (decision 204, "NO" branch), security program 112 determines the location of computing device 120 (step 208B) and then transmits an alert to security personnel detailing the location of computing device 120 (step 214). In the example embodiment, security program 112 transmits an alert to security personnel detailing the location of computing device 120 regardless of whether the user of computing device 120 is able to be identified or not. However, in other embodiments, security program 112 may utilize security cameras and facial recognition technology, in the same manner as described above, to attempt to identify the user of computing device 120 prior to transmitting an alert to security personnel.

The foregoing description of various embodiments of the present invention has been presented for purposes of illustration and description. It is not intended to be exhaustive nor to limit the invention to the precise form disclosed. Many modifications and variations are possible. Such modifications and variations that may be apparent to a person skilled in the art of the invention are intended to be included within the scope of the invention as defined by the accompanying claims.

Figure 3:
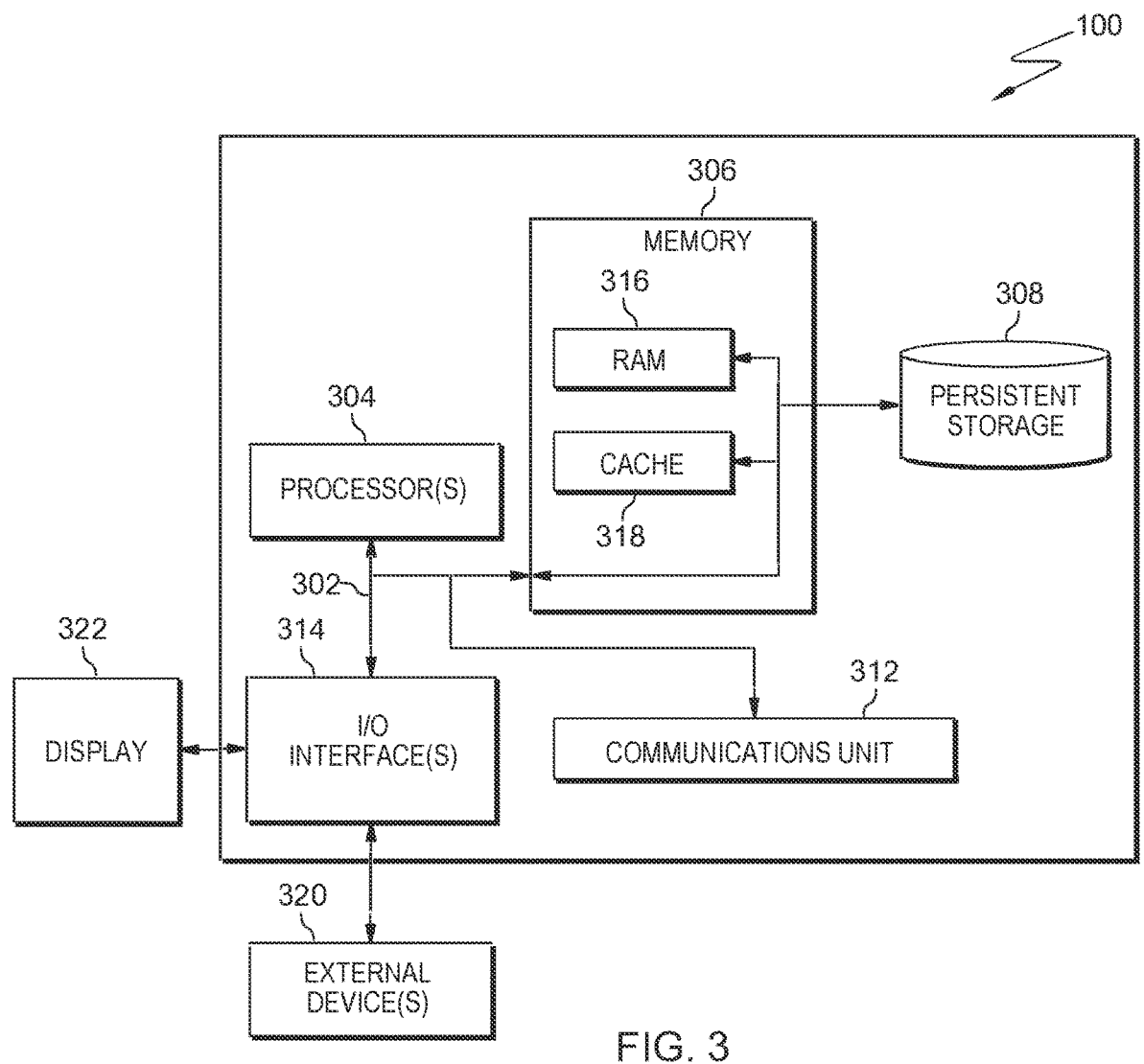
FIG. 3 is a block diagram depicting the hardware components of the security system of FIG. 1, in accordance with an embodiment of the invention.

FIG. 3 depicts a block diagram of components of server 110 and computing device 120 of network security system 100 in accordance with an illustrative embodiment of the present invention. It should be appreciated that FIG. 3 provides only an illustration of one implementation and does not imply any limitations with regard to the environments in which different embodiments may be implemented. Many modifications to the depicted environment maybe made.

Server 110 and computing device 120 include communications fabric 302, which provides communications between computer processor(s) 304, memory 306, persistent storage 308, communications unit 312, and input/output (1/0) interface(s) 314. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are computer-readable storage media. In this embodiment, memory 306 includes random access memory (RAM) 316 and cache memory 318. In general, memory 306 can include any suitable volatile or non-volatile computer-readable storage media.

Security program 112 and database 114 in server 110 may be stored in persistent storage 308 for execution by one or more of the respective computer processors 304 via one or more memories of memory 306. In this embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer-readable storage medium that is also part of persistent storage 308.

Communications unit 312, in these examples, provides for communications with other data processing systems or devices. In these examples, communications unit 312 includes one or more network interface cards. Communications unit 312 may provide communications through the use of either or both physical and wireless communications links. Security program 112 and database 114 in server 110 may be downloaded to persistent storage 308 through communications unit 312.

1/0 interface(s) 314 allows for input and output of data with other devices that may be connected to server 110 and computing device 120. For example, 1/0 interface 314 may provide a connection to external devices 320 such as, a keyboard, keypad, a touch screen, and/or some other suitable input device. External devices 320 can also include portable computer-readable storage media such as, for example, thumb drives, portable optical or magnetic disks, and memory cards. Software and data used to practice embodiments of the present invention, e.g., security program 112 and database 114 in server 110, can be stored on such portable computer-readable storage media and can be loaded onto persistent storage 308 via 1/0 interface(s) 314. 1/0 interface(s) 314 can also connect to a display 322.

Display 322 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature. The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge devices. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or device. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method, comprising the steps of:
  detecting, by one or more processors that a computing device has connected to a network;

determining, by the one or more processors, whether the computing device is valid, based on determining that the computing device is valid, determining, by the one or more processors, whether the computing device is being utilized for one or more suspicious activities;

based on determining that the computing device is being utilized for one or more suspicious activities:

determining, by the one or more processors, a location of the computing device;

determining, by the one or more processors, whether a user of the computing device can be identified based on facial recognition;

based on determining that the user associated with the computing device cannot be identified, disabling the computing device; and based on determining that the computing device is valid and is not being utilized for one or more suspicious activities, repeating the step of determining whether the computing device is being utilized for one or more suspicious activities until the computing device is no longer connected to the network.

2. The method of claim 1, further comprising:

based on determining that the computing device is not valid, determining, by one or more processors, a location of the computing device and transmitting an alert to security personnel.

3. The method of claim 1, wherein the step of determining, by the one or more processors, whether a user of the computing device can be identified based on the facial recognition identified from images of security cameras or a camera of the computing device.

4. The method of claim 1, wherein the step of disabling the computing device includes disabling the computing device via the network.

5. The method of claim 1, wherein the step of determining, by one or more processors, whether the computing device is being utilized for one or more suspicious activities further comprises determining whether the computing device is attempting to download a confidential document.

6. The method of claim 1, wherein the step of determining, by one or more processors, whether the computing device is being utilized for one or more suspicious activities further comprises:

comparing one or more resources accessed in a first-time period to one or more resources accessed in a previous time period;

determining a similarity factor based on comparing one or more resources accessed in a first-time period to one or more resources accessed in a previous time period; and determining whether the similarity factor is below a threshold value.

7. The method of claim 2, wherein the step of determining, by the one or more processors, whether the computing device is valid includes whether the device is allowed to access the network.

8. A computer program product for administering security for a network, the computer program product comprising:

one or more computer-readable storage devices and program instructions stored on at least one of the one or more computer-readable storage devices, the program instructions comprising:

program instructions to detect that a computing device has connected to a network;

based on determining that the computing device is connected to the network, program instructions to determine whether the computing device is being utilized for one or more suspicious activities;

based on determining that the computing device is being utilized for one or more suspicious activities:

program instructions to determine a location of the computing device;

program instructions to determine whether a user of the computing device can be identified based on facial recognition; and based on determining that the user associated with the computing device cannot be identified, program instructions to disable the computing device; and program instructions to determine whether the computing device is valid, and based on determining that the computing device is valid and is not being utilized for one or more suspicious activities, repeating the step of determining whether the computing device is being utilized for one or more suspicious activities until the computing device is no longer connected to the network.

9. The computer program product of claim 8, wherein the program instructions to determine whether a user of the computing device can be identified based on the facial recognition are identified from images of security cameras of an area of the network or a camera of the computing device.

10. The computer program product of claim 8, wherein the program instructions to determine a location of the computing device further comprises program instructions to determine one or more access points of the network accessed by the computing device and utilize triangulation techniques.

11. The computer program product of claim 8, wherein the program instructions to disable the computing device includes disabling the computing device via the network.

12. The computer program product of claim 8, wherein program instructions to determine whether the computing device is being utilized for one or more suspicious activities further comprises:

program instructions to compare one or more resources accessed in a first-time period to one or more resources accessed in a previous time period;

program instructions to determine a similarity factor based on the program instructions to compare one or more resources accessed in a first-time period to one or more resources accessed in a previous time period; and program instructions to determine whether the similarity factor is below a threshold value.

13. A computer system administering security for a network, the computer system comprising:

one or more processors, one or more computer-readable memories, one or more computer-readable tangible storage devices, and program instructions stored on at least one of the one or more computer-readable tangible storage devices for execution by at least one of the one or more processors via at least one of the one or more memories, the program instructions comprising:

program instructions to detect that a computing device has connected to a network in an area;

based on determining that the computing device is connected to the network, program instructions to determine whether the computing device is being utilized for one or more suspicious activities;

based on determining that the computing device is being utilized for one or more suspicious activities:

program instructions to determine a location of the computing device;

program instructions to determine whether a user of the computing device can be identified by cameras for monitoring the area based on facial recognition;

based on determining that the user associated with the computing device cannot be identified, program instructions to disable the computing device; and program instructions to determine whether the computing device is valid, and based on determining that the computing device is valid and is not being utilized for one or more suspicious activities, repeating the step of determining whether the computing device is being utilized for one or more suspicious activities until the computing device is no longer connected to the network.

14. The computer system of claim 13, wherein the program instructions to determine whether a user of the computing device can be identified based on the facial recognition identified from images of a camera of the computing device.

15. The computer system of claim 13, wherein the program instructions to determine a location of the computing device further comprises program instructions to determine one or more access points of the network accessed by the computing device and utilize triangulation techniques.

16. The computer system of claim 13, wherein the program instructions to disable the computing device includes disabling the computing device via the network.

17. The computer system of claim 13, wherein program instructions to determine whether the computing device is being utilized for one or more suspicious activities further comprises:

program instructions to compare one or more resources accessed in a first-time period to one or more resources accessed in a previous time period;

program instructions to determine a similarity factor based on the program instructions to compare one or more resources accessed in a first-time period to one or more resources accessed in a previous time period; and program instructions to determine whether the similarity factor is below a threshold value.

18. The computer system of claim 14, wherein the step of determining whether the computing device is valid includes whether the device is allowed to access the network.

* * * * *